United States Patent Office.

EDWARD L. SEYMOUR, OF NEW YORK, N. Y.

Letters Patent No. 71,229, dated November 19, 1867.

IMPROVEMENT IN THE MANUFACTURE OF BRICKS, RETORTS, MUFFLES, CRUCIBLES, &c.

*The Schedule referred to in these Letters Patent and making part of the same.*

TO ALL WHOM IT MAY CONCERN:

Be it known that I, EDWARD L. SEYMOUR, of the city, county, and State of New York, have invented an improved Method of Manufacturing Bricks, Retorts, Muffles, Crucibles, and other Fire-Proof Materials for metallurgical and chemical purposes, of which the following is a true and correct description.

Lime, magnesia, pure clay, talc, and other silicates of magnesia, are infusible (at the greatest heat that can be produced in our usual furnaces) when alone; but, in combination with each other, and particularly in the presence of metallic oxides and of alkalies, they vitrify and fuse readily, one of the greatest difficulties metallurgy has to cope with. To meet this difficulty in the manufacture of fire-proof vessels and materials, such as crucibles, retorts, muffles, bricks, slabs, &c., I make use of emery, which substance, particularly when finely pulverized and freed from metallic oxides and earthy impurities, can be exposed to the strongest white heat of our usual smelting furnaces, in contact with metallic oxides, with alkalies and silicates of any description, without fusing or thoroughly vitrifying. To form it into a plastic paste or mass, I mix it intimately with a sufficient quantity of pure hydrated alumina in combination with albumen, of borate of alumina, of borate of soda and alumina, or of pure silicate of alumina. The latter, being the most economical, answers almost every purpose as a binding or agglutinating menstruum, with emery as a basis.

What I claim as my invention, and desire to secure by Letters Patent, is—

The employment of pulverized emery, in combination with any one or more of the materials aforenamed, for the purpose specified.

E. L. SEYMOUR.

Witnesses:
   J. B. HYDE,
   CHARLES WRIGHT.